United States Patent
Tsuge et al.

(10) Patent No.: US 6,757,609 B2
(45) Date of Patent: Jun. 29, 2004

(54) VEHICLE NAVIGATION SERVER FOR OBTAINING TRAFFIC INFORMATION FOR MESH UNIT ON TRAVEL ROUTE

(75) Inventors: Masakuni Tsuge, Saitama (JP); Toshihide Yofu, Utsunomiya (JP); Hiroyuki Tsuda, Asaka (JP); Kouichi Washimi, Nara (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,754

(22) Filed: Aug. 26, 2003

(65) Prior Publication Data

US 2004/0044471 A1 Mar. 4, 2004

(30) Foreign Application Priority Data

Aug. 28, 2002 (JP) ........................................ 2002-249659

(51) Int. Cl.[7] .............................................. G01C 21/30
(52) U.S. Cl. ...................... 701/209; 701/24; 342/357.13
(58) Field of Search ...................... 701/23–26, 200–202, 701/207–210; 340/988, 990, 995.1; 73/178 R; 342/357.13, 457, 463

(56) References Cited

U.S. PATENT DOCUMENTS 6,334,089 B2 * 12/2001 Hessing ...................... 701/209

FOREIGN PATENT DOCUMENTS

JP  A1 09-126798  5/1997

OTHER PUBLICATIONS

U.S. Pub. No. U.S. 2002/0152115 A1 Morita et al. disclose a vehicle managing method filed Oct. 17, 2002.*

* cited by examiner

Primary Examiner—Gertrude A. Jeanglaude
(74) Attorney, Agent, or Firm—Lahive & Cockfield, LLP; Anthony A. Laurentano, Esq.

(57) ABSTRACT

A vehicle navigation server for providing traffic information, which is useful and has a suitable data amount, to a vehicle navigation device, so as to make the vehicle have a comfortable travel. The server calculates at least one proposed travel based on input data including a current or start position and a destination of the vehicle, and defines a map mesh consisting of mesh units on the proposed travel route. The server extracts traffic information relating to each mesh unit from a traffic information storage device in turn, where traffic information relating to the mesh unit which includes the start or current position is obtained first. The server monitors a total amount of extracted information, and terminates information extraction for the following mesh units when the total amount becomes equal to or larger than a predetermined value. The server then sends the traffic information to a vehicle navigation device.

16 Claims, 7 Drawing Sheets

VEHICLE NAVIGATION SERVER FOR OBTAINING TRAFFIC INFORMATION FOR MESH UNIT ON TRAVEL ROUTE

BACKGROUND OF THE INVENTION

1. Field of the Invention

The present invention relates to a vehicle navigation server.

2. Description of the Related Art

In recently developed vehicle navigation servers, a route to the destination of a vehicle is searched for based on data of the destination defined and input by a passenger, and data of the determined route and information relating to the route are sent to a vehicle navigation device built into the vehicle.

Japanese Patent No. 3288565 discloses a technique in which traffic regulation information, which is effective at present, is selected from data of traffic regulation information input from an external device, and the selected information is displayed on a map indicated by map display means.

However, the capacity of a memory built in the vehicle navigation device is limited; thus, if all data of the determined route and information related to the route are received, a heavy burden is imposed on the memory, which is not preferable.

Additionally, in the above patent, it is determined whether the traffic information is effective at present according to temporal selection of information; however, no geographical factor is considered in the determination. Even traffic information assigned to the determined route may not be very important if the traffic information relates to a point far from the vehicle. Accordingly, the technique disclosed in the patent is not always efficient.

SUMMARY OF THE INVENTION

In consideration of the above circumstances, an object of the present invention is to provide a vehicle navigation server for providing traffic information, which is useful and has a suitable data amount, to a vehicle navigation device, so as to make the vehicle have a comfortable travel.

Therefore, the present invention provides a vehicle navigation server (e.g., a navigation server 5 in an embodiment explained below) comprising:

a travel route calculating device for calculating at least one proposed travel route of a vehicle (e.g., a vehicle 3 in the embodiment) based on data input by a registrant to the server, the data including a current or start position and a destination of the vehicle;

a map mesh defining device for defining a map mesh consisting of mesh units (e.g., mesh units M01, M02 ... , M08 in the embodiment), which contains the proposed travel route;

a traffic information extracting device for extracting traffic information relating to each mesh unit of the proposed travel route from a traffic information storage device (e.g., a storage device 16 in the embodiment) in turn, in a manner such that traffic information relating to the mesh unit which includes the start or current position of the vehicle (e.g., the mesh unit M01 in the embodiment) is obtained first;

a data amount monitoring device for monitoring a total amount of extracted information, where the data amount monitoring device terminates information extraction for the following mesh units when the total amount becomes equal to or larger than a predetermined value; and a data sending device for sending the extracted traffic information to a vehicle navigation device (e.g., a vehicle navigation device 8 in the embodiment) built into the vehicle.

Typically, the traffic information is extracted for each mesh unit in order from the mesh unit closest to the vehicle to the mesh unit furthest from the vehicle.

According to the above structure, the traffic information sent to the vehicle navigation device is obtained in a manner such that the traffic information relating to each mesh unit is obtained in turn, from the first mesh unit which is closest to the vehicle. Therefore, useful information for the vehicle can be obtained, and such information is used for calculating a travel route, so that the vehicle can have a comfortable travel.

In addition, when the total amount of the obtained traffic information becomes equal to or larger than a predetermined value, no traffic information is further obtained for the following mesh units. Therefore, it is possible to prevent excessive burden from being imposed on the memory of the vehicle navigation device. That is, no traffic information relating to the mesh units, which follow the mesh unit at which the total amount of the obtained traffic information has become equal to or larger than a predetermined value, is obtained. Therefore, the area for which the traffic information is updated can be localized. In comparison with the case of obtaining the traffic information relating to all mesh units, the amount of transmitted data can be reduced, thereby reducing the cost and time necessary for communication. In addition, the obtained traffic information can be quickly reflected in map data, thereby improving the responsiveness. Here, the traffic information may be sent to the vehicle navigation device every time the traffic information for a mesh unit is obtained, or after the traffic information for all target mesh units (i.e., selected mesh units for which traffic information should be obtained) are obtained.

As a preferable example, the traffic information sent to the vehicle navigation device is selectable for each of information categories (e.g., traffic regulation information and traffic jam information in the embodiment), and traffic information belonging to at least one information category which is selected freely or in advance (e.g., the traffic regulation information in the embodiment) is extracted and sent to the vehicle navigation device. The at least one information category may be selected in advance by a passenger of the vehicle.

According to this example, the traffic information required by a passenger can be selected; thus, the traffic information which is essential for the passenger can be sent. Therefore, in comparison with the case of sending traffic information in all categories, the amount of the traffic information can be reduced, thereby further reducing the burden imposed on the memory of the vehicle navigation device.

As another preferable example, the traffic information sent to the vehicle navigation device is a combination of detailed information about a section (e.g., a section from mesh unit M01 to mesh unit M03 in the embodiment) from the mesh unit which includes the current or start position of the vehicle to a predetermined one of the mesh units (e.g., the mesh unit M03 in the embodiment) and simplified information about the remaining mesh units following the predetermined mesh unit.

According to this example, traffic information for a section relatively close to the vehicle, which (the information)

is highly urgent or useful for a passenger of the vehicle, can be detailed information, while traffic information for a section relatively far from the vehicle can be simplified but highly-useful information. That is, only traffic information having high priority with respect to the necessity for the passenger can be sent. When receiving such traffic information, the vehicle navigation device can calculate a further suitable travel route, thereby further improving the comfort of travel of the vehicle.

DESCRIPTION OF THE PREFERRED EMBODIMENTS

Hereinafter, a vehicle navigation server as an embodiment according to the present invention will be explained with reference to the drawings.

Figure 1:
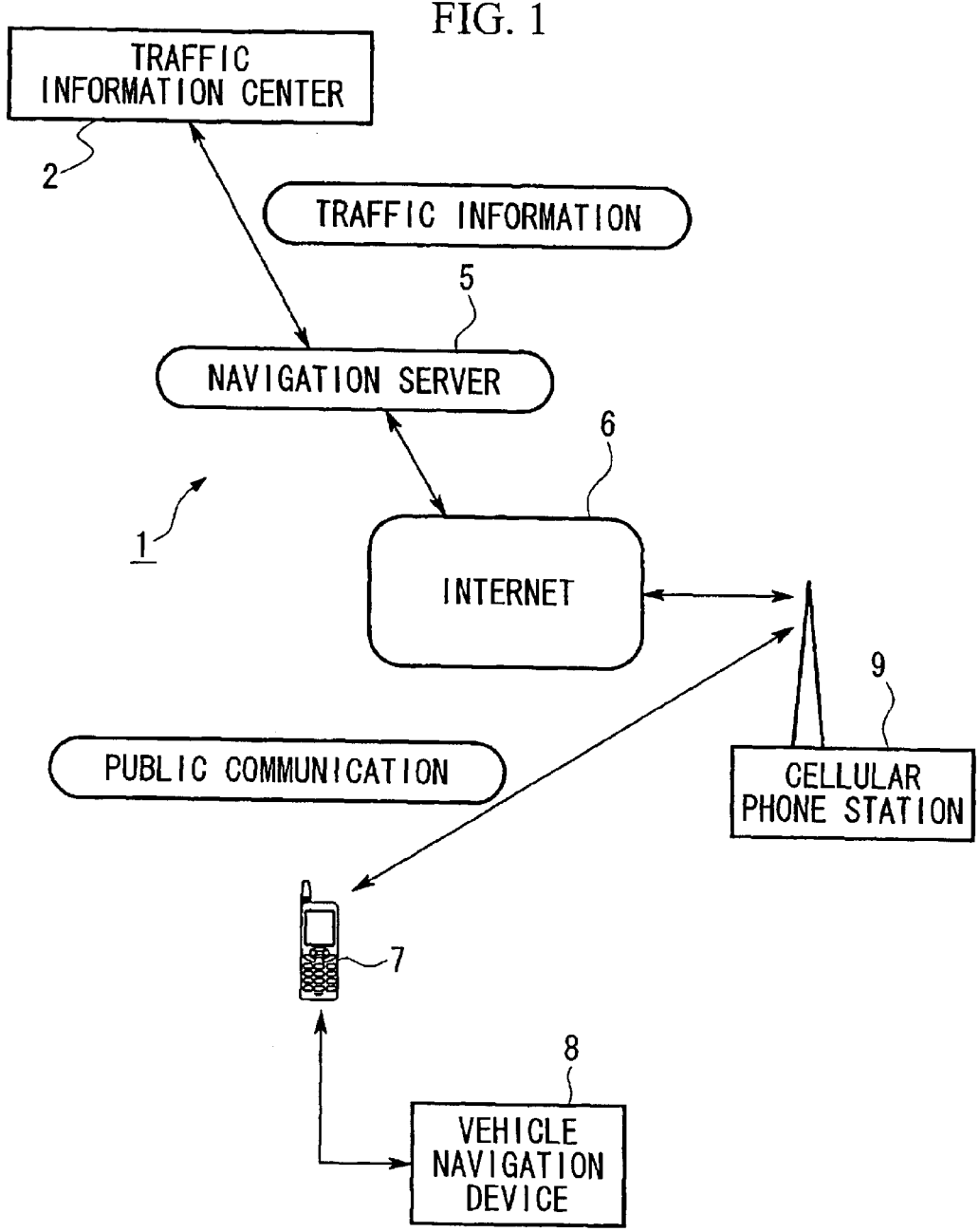
FIG. 1 is a diagram showing the general structure of the vehicle navigation system in which the vehicle navigation server as an embodiment of the present invention is employed.

FIG. 1 is a diagram showing the general structure of the vehicle navigation system 1 in which the (vehicle) navigation server 5 as an embodiment of the present invention is employed.

The navigation server 5 (detailed explanations thereof will be provided below) is provided for receiving necessary traffic information from a traffic information center 2 and supplying the traffic information to a vehicle navigation device 8 built into a vehicle. The navigation server 5 is connected to the Internet 6.

The vehicle navigation device 8 can send and receive data to and from the cellular phone station 9 via a cellular phone 7 which is a portable terminal for a passenger of the vehicle. The cellular phone station 9 is connected to the Internet 6, so that data transmission between the vehicle navigation device 8 and the navigation server 5 can be performed.

The vehicle navigation device 8 has a GPS (global positioning system) antenna for determining the current position of the vehicle, a GPS receiver, a road map database, and a display screen, and the current position of the vehicle, detected by the GPS function, can be shown on the display screen.

The vehicle navigation device has an arithmetic unit and a memory. The arithmetic unit can calculate a travel route based on input travel conditions. The input travel conditions include the current or start position and the destination, and may include a position where the vehicle will pass and a priority route (e.g., a route giving priority to general roads or toll roads, and a route determined by giving priority to the distance or the width of the road). The memory can store the road map database, the input data, and the calculated travel route, and can also store data sent from the navigation server 5.

Figure 2:
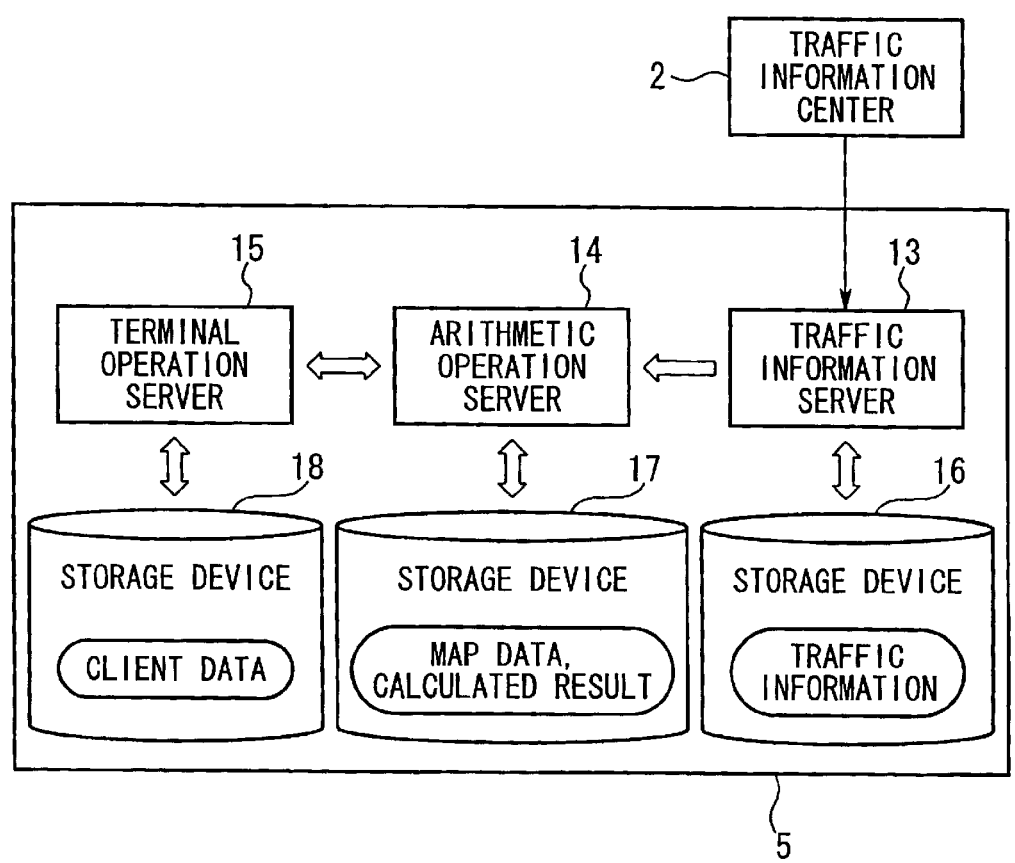
FIG. 2 is a block diagram showing the structure of the navigation server in FIG. 1.

The navigation server 5 will be explained below. FIG. 2 is a block diagram showing the structure of the navigation server 5 in FIG. 1.

The navigation server 5 has a traffic information server 13, an arithmetic operation server 14, and a terminal operation server 15, to which storage devices 16, 17, and 18 are respectively connected.

The traffic information server 13 is connected to the traffic information center 2. The traffic information server extracts traffic information from the traffic information center 2 as needed and stores the extracted traffic information in the storage device 16 to which the server 13 is connected. The traffic information stored in the storage device 16 is updated every time the traffic information server 13 extracts traffic information from the traffic information center 2, so that substantially the newest traffic information is stored in the storage device 16.

The terminal operation server 15 is connected to the vehicle navigation device 8 via the Internet 6, so that data transmission between the terminal operation server 15 and the vehicle navigation device 8 is performed. In the storage device 18 connected to the terminal operation server 15, identification data of clients (i.e., registrants), the permitted amount of data to be received by the vehicle navigation device 8, and the like are stored.

The arithmetic operation server 14 is connected to the terminal operation server 15 and the traffic information server 13. Based on the input data from a client, which the terminal operation server 15 received, a proposed travel route is calculated. In the next step, traffic information relating to the calculated travel route is retrieved from the traffic information server 13. The arithmetic operation server 14 is connected to the storage device 17 in which map data and calculated results are stored.

Figure 3:
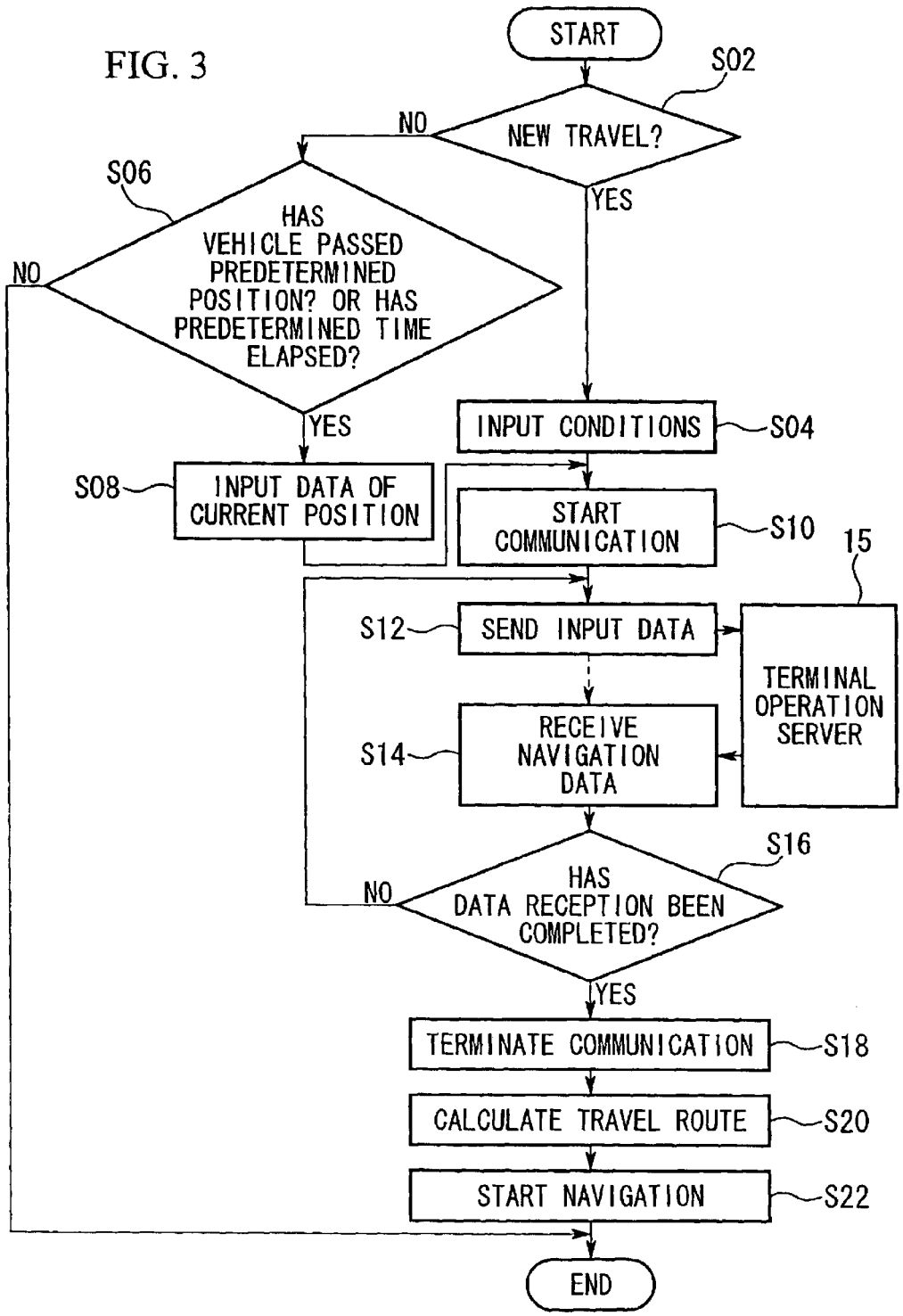
FIG. 3 is a process chart of the navigation operation of the vehicle navigation device in FIG. 1.

FIG. 3 is a process chart of the navigation operation of the vehicle navigation device 8. In the first step S02, it is determined whether the target is a new travel to which no travel guide has been assigned. If the result of the determination is "YES" (i.e., a new travel), the operation proceeds to step S04, while if the result of the determination is "NO" (i.e., not a new travel), the operation proceeds to step S06. In step S04, the above-explained travel conditions are input into the memory of the vehicle navigation device 8, and the operation proceeds to step S10.

In step S06, it is determined whether the vehicle has passed a predetermined position (corresponding to the communication point explained below) or a predetermined time has elapsed. If the result of the determination of step S06 is "YES", the operation proceeds to step S08, while if the result of the determination is "NO", the operation is terminated for the present. In step S08, data of the current position detected by the vehicle navigation device 8 by using the GPS function is input into the memory, and the operation proceeds to step S10.

In step S10, the cellular phone 7 connected to the vehicle navigation device 8 is operated so as to connect to the Internet 6 via the cellular phone station 9 and to start communication. In the following step S12, the input data (data related to step S04 or S08, that is, the new travel or the current position) is sent to the terminal operation server 15 of the navigation server 5.

Figure 4:
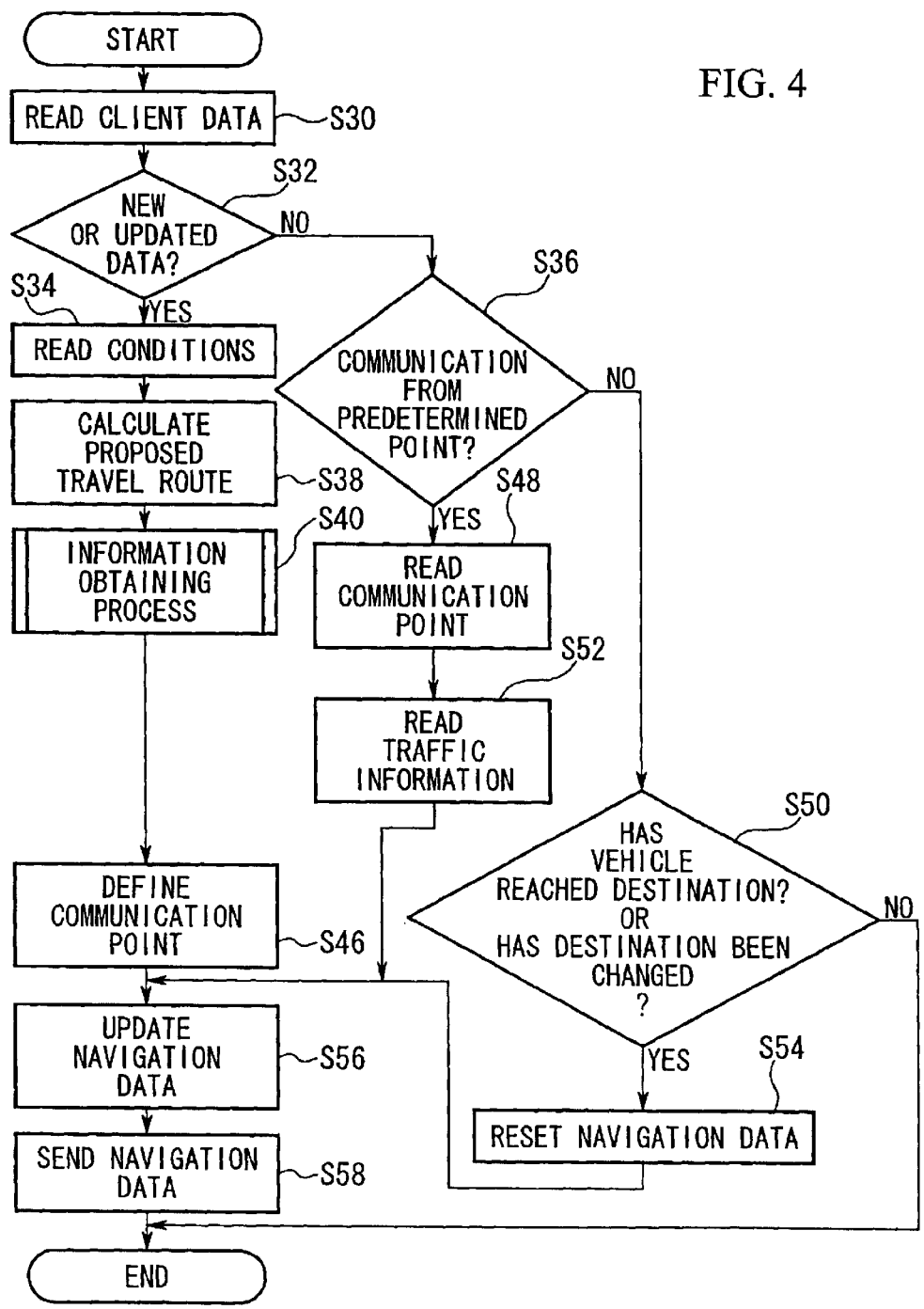
FIG. 4 is a process chart of the navigation operation of the navigation server in FIG. 1.

Based on the received data, the terminal operation server 15 executes the following operation. FIG. 4 is a process chart of the navigation operation performed by the navigation server 5. In the first step S30, client data of the relevant client is read by the terminal operation server 15.

The client data is authentication data such as an identification number and a password for identifying a registered client. That is, the client who sent data is identified by reading the client data, and the arithmetic operation server 14 performs the following operation.

First, in step S32, it is determined whether the input travel conditions are new or updated data, that is, whether a proposed travel route should be calculated. If the result of the determination is "YES", the operation proceeds to step S34, while if the result of the determination is "NO", the operation proceeds to step S36.

In step S34, the travel conditions sent from the client are read and stored in the storage device 17 connected to the arithmetic operation server 14. In the following step S38, a route for satisfying the travel conditions is calculated by the arithmetic operation server 14, where at least one proposed travel route is calculated.

Figure 5:
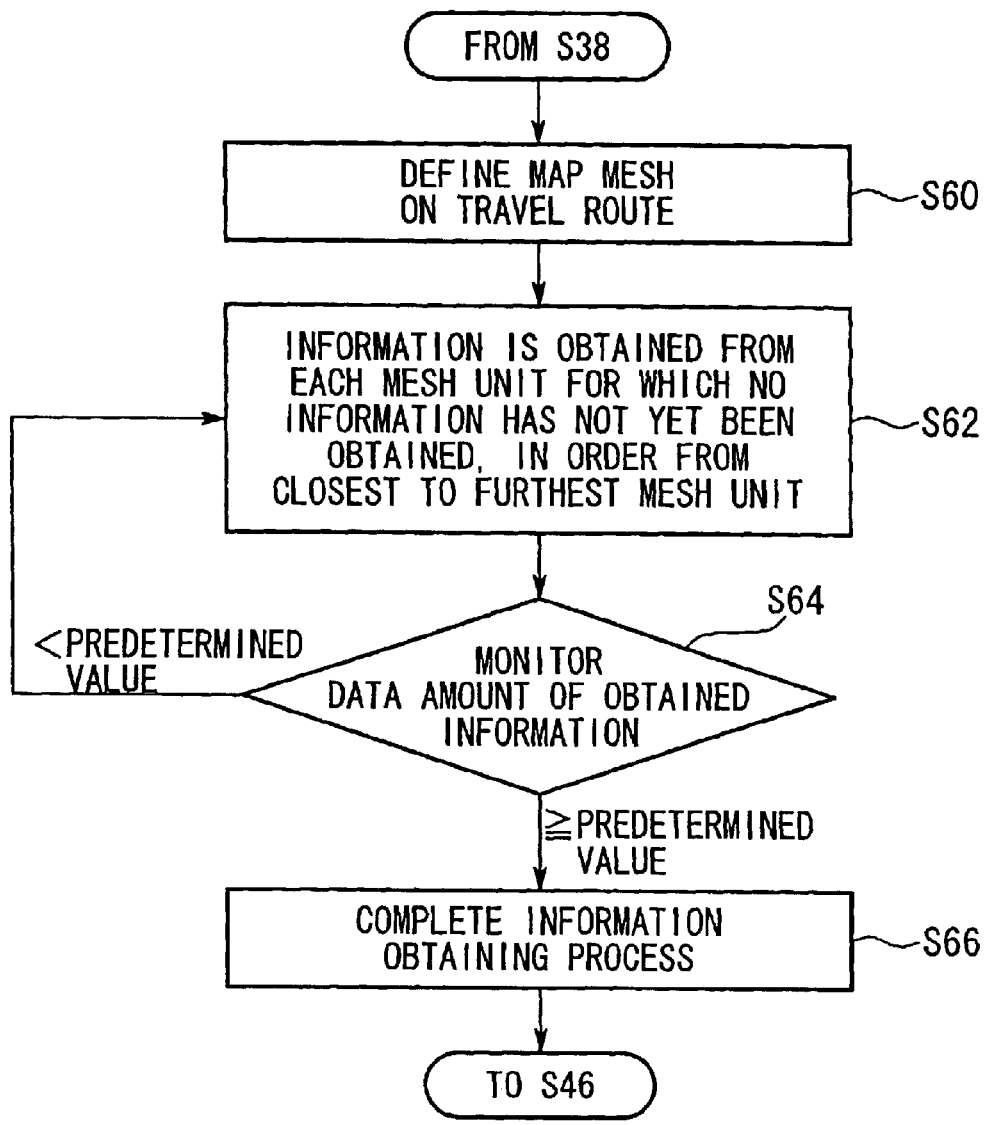
FIG. 5 is a process chart of an example of the information obtaining process in FIG. 4.

In the following step S40, the information obtaining process is executed. FIG. 5 is a process chart showing the information obtaining process in FIG. 4.

Figure 7:
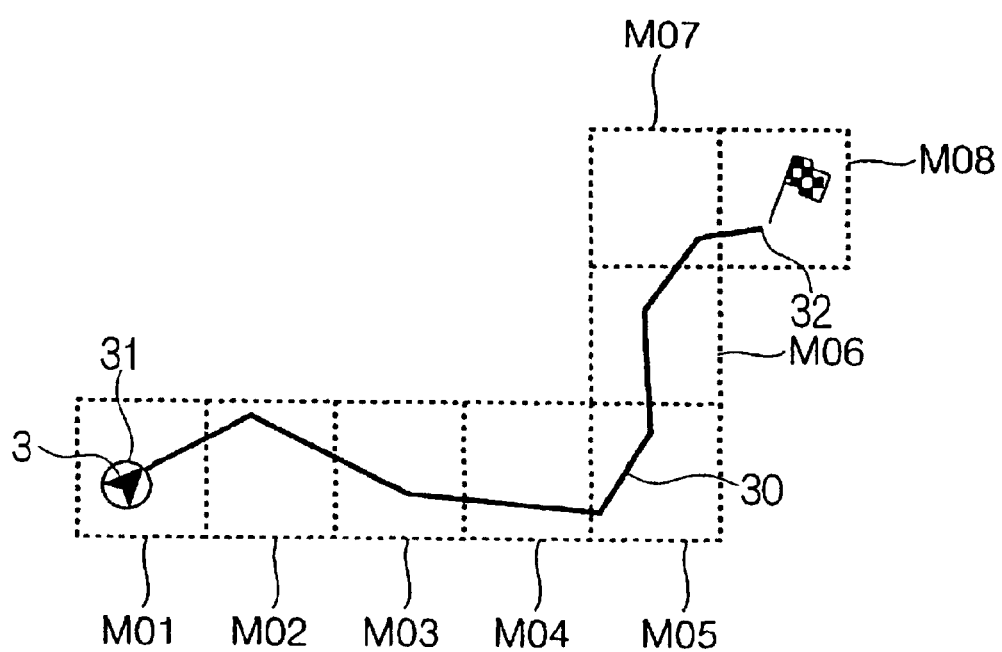
FIG. 7 is a diagram for explaining definition of a map mesh on a travel route and a traffic information obtaining process.

In the first step S60, a map mesh consisting of mesh units M01, M02, . . . , M08, in which the above-explained proposed travel route is contained, is defined (see FIG. 7). FIG. 7 is a diagram for explaining definition of the mesh units M01, M02, . . . , M08 and a traffic information obtaining process. In FIG. 7, reference numeral 3 indicates a vehicle, reference numeral 30 indicates the proposed travel route, reference numeral 31 indicates the start or current position of the vehicle 3 (the start position is used if the vehicle has not yet started), and reference numeral 32 indicates the destination of the vehicle 3. In the next step S62, traffic information is obtained from each mesh unit for which no traffic information has not yet been obtained, in order from the mesh unit closest to the vehicle to the mesh unit furthest from the vehicle. Here, traffic information is first obtained from the mesh unit M01 which includes the start or current position of the vehicle 3.

In the next step S64, the data amount of the obtained information is monitored, and it is determined whether the total data amount of the obtained information (i.e., the data amount of all information which has been obtained up to the present) is equal to or larger than a predetermined value. If it is determined that the total data amount is smaller than the predetermined value, the operation returns to step S62 and the above-explained process of obtaining the traffic information is repeated. If it is determined that the total data amount is equal to or larger than the predetermined amount, the operation proceeds to step S66 and the traffic information obtaining process is completed. For example, if it is determined that the total data amount is equal to or larger than the predetermined amount after the traffic information for the mesh unit M03 has been obtained, then no traffic information is obtained from the following mesh units M04 to M08. The operation then proceeds to step S46.

In step S46, communication points are defined. Each communication point is defined on the proposed travel route, and when the vehicle passes the point, communication with the traffic information center 2 is performed so as to newly extract traffic information for the remaining route to the destination. The communication points are defined in a manner such that a point from which a detour can be defined (i.e., an intersection or a road branch) is included in the points.

In the following step S56, navigation data is updated. Here, the traffic information for the calculated proposed travel route and data of the communication points are input as navigation data. In the next step S58, the navigation data is sent from the terminal operation server 15 to the vehicle navigation device 8, and the operation of the navigation server 5 is terminated.

In the vehicle navigation device 8, the navigation data including the traffic information is received (see step S14 of FIG. 3). In the following step S16, it is determined whether the data reception has been completed. If the result of the determination is "YES", the operation proceeds to step S18, where the communication is terminated. In this case, the navigation data is stored in the memory of the vehicle navigation device 8. If the result of the determination is "NO", the operation returns to step S12, and the above-explained communicating operation is repeated.

In step S20, a travel route is calculated in the vehicle navigation device 8. In the calculation, the navigation data is considered, thereby calculating a suitable travel route. In step S22, navigation based on the determined route is started, and the operation of a series of the above-explained steps is suspended.

As explained above, the traffic information sent to the vehicle navigation device 8 is obtained in a manner such that the traffic information relating to each mesh unit is obtained in turn, from the mesh unit which includes the start or current position of the vehicle 3, in order from the closet mesh unit to the furthest mesh unit. Therefore, the obtained traffic information relates to an area closer to the vehicle 3 and may thus be urgent information or other useful information for the passenger in the vehicle 3. The travel route calculated by referring to such traffic information can make the vehicle have a comfortable travel. In addition, when the total amount of the obtained traffic information becomes equal to or larger than a predetermined value, no traffic information is further obtained for the following mesh units. Therefore, it is possible to prevent excessive burden from being imposed on the memory of the vehicle navigation device 8.

When the vehicle 3 runs along the travel route and passes each communication point, the navigation operation as shown in FIGS. 3 and 4 is started again. In this case, the result of the determination of step S32 of FIG. 4 is "NO", and in step S36, it is determined whether the communication has been performed from a predetermined point (i.e., the communication point). If the result of the determination is "YES", the operation proceeds to step S48, while if the result of the determination is "NO", the operation proceeds to step S50.

In step S48, data of the communication point which the vehicle 3 has passed is read, and in the following step S52, traffic information relating to an area from this communication point to the destination is extracted from the traffic information center 2 via the traffic information server 13, and the traffic information stored in the storage device 16 is updated. In the next step S56, the navigation data is updated to employ the newly obtained traffic information, and the following necessary steps as explained above are performed. Here, data relating to the communication point which the vehicle has already passed, that is, data unnecessary for the vehicle 3 and the navigation server 5, is deleted, thereby securing a sufficient area for storing necessary information. Accordingly, more suitable and preferable travel guiding operation can be performed.

In step S50, it is determined whether one of the following states is detected: (i) the vehicle 3 has reached the destination 20 and (ii) the destination has been changed and thus the route guiding operation has been terminated. If the result of the determination is "YES", the operation proceeds to step S54. If the result of the determination is "NO", the operation proceeds to step S14, and the subsequent steps are performed.

In step S54, the navigation data is reset or cleared, and in step S56, definition of the communication points before arrival or changing of the destination is released and data of the communication points are deleted from the storage devices 16 to 18 of the navigation server 15 and the memory of the vehicle navigation device 8. Accordingly, it is possible to prevent unnecessary information from being updated, and storage capacity for necessary information can be secured, thereby performing more suitable route guiding operation.

Below, another example of the information obtaining process in step S40 will be explained with reference to FIG. 6. In this case, the traffic information sent to the vehicle navigation device 8 is classified so as to provide more detailed information.

Table 1 shows the classified information categories.

TABLE 1

| 1. traffic regulation information | 2. traffic jam information | 3. . . . | 4. . . . | . . . |

As shown in Table 1, the traffic information is classified into categories, and detailed information is stored for each category (refer to Tables 2 and 3).

TABLE 2

1. traffic regulation information structure

| kind of regulation | cause | details of regulation | details of cause | kind of vehicle | time |
|---|---|---|---|---|---|
| 0: no regulation | 0: no incident | : | : | : | : |
| 1: closed to traffic | 1: accident | : | : | : | : |
| 2: no right/left-turn | 2: fire | : | : | : | : |
| 3: speed regulation | 3: damaged vehicle | : | : | : | : |
| 4: traffic lane regulation | 4: on-road obstacle | : | : | : | : |
| : | : | : | : | : | : |
| : | : | : | : | : | : |

TABLE 3

2. traffic jam information structure

| state of jam | number of jammed places | extension data |
|---|---|---|
| 0: unknown | 0: same state through the entire place; no extension data | : |
| 1: no jam | 1: one jammed place in the same mesh unit; extension data × 1 | : |
| 2: crowded | 2: two jammed places in the same mesh unit; extension data × 2 | : |
|  | 3: three jammed places in the same mesh unit; . . . | : |
|  | : | : |
|  | : | : |

Tables 2 and 3 respectively indicate the structures of the traffic regulation information and the traffic jam information in Table 1. Therefore, each structure of the information category can be selected and the contents in the selected structure can be sent to the vehicle navigation device 8.

In step S60 of FIG. 6, the mesh units M01 to M08 are defined over the proposed travel route, and in the following step S72, it is determined whether the information category #n (here, #1. traffic regulation information, #2. traffic jam information, . . . ) is a target category about which information will be obtained, where the initial value of n is 1. Here, whether each information category is a target category is defined in advance by a passenger of the vehicle or the like, and data of the definition is also sent in advance to the navigation server 5.

If the result of the determination of step S72 is "YES", the operation proceeds to step S74. In step S74, traffic information belonging to the target information category #n (e.g., #1. traffic regulation information while n=1) is obtained from each mesh unit for which no traffic information has not yet been obtained, in order from the mesh unit closest to the vehicle 3 to the mesh unit furthest from the vehicle 3.

If the result of the determination of step S72 is "NO", the current information category #n is not a target category (for obtaining information); thus, n is updated by adding 1 to n, so that the process of step S72 is again performed for a different information category (e.g., #2. traffic jam information when n is updated to 2). This routine of updating n and returning to step S72 is repeated until information belonging to a target category is obtained.

After information belonging to a target category is obtained in step S74 (the order of obtaining information is determined in a manner similar to that in step S62), the operation proceeds to step S76, where the data amount of the obtained information is monitored. That is, it is determined whether the total data amount of the obtained information is equal to or larger than a predetermined value. If it is determined that the total data amount is equal to or larger than the predetermined value, the information obtaining process is completed, and the operation proceeds to the above-explained step S46. If it is determined that the total data amount is smaller than the predetermined value, n is updated by adding 1 to n, so that the process of step S72 is again performed for a different information category. This routine of updating n and returning to step S72 is repeated until the total data amount becomes equal to or larger than the predetermined value.

As explained above, the traffic information required by a passenger can be selected; thus, the traffic information which is essential for the passenger can be sent. Therefore, in comparison with the case of sending traffic information in all categories, the amount of the traffic information can be reduced, thereby further reducing the burden imposed on the memory of the vehicle navigation device 8.

Figure 6:
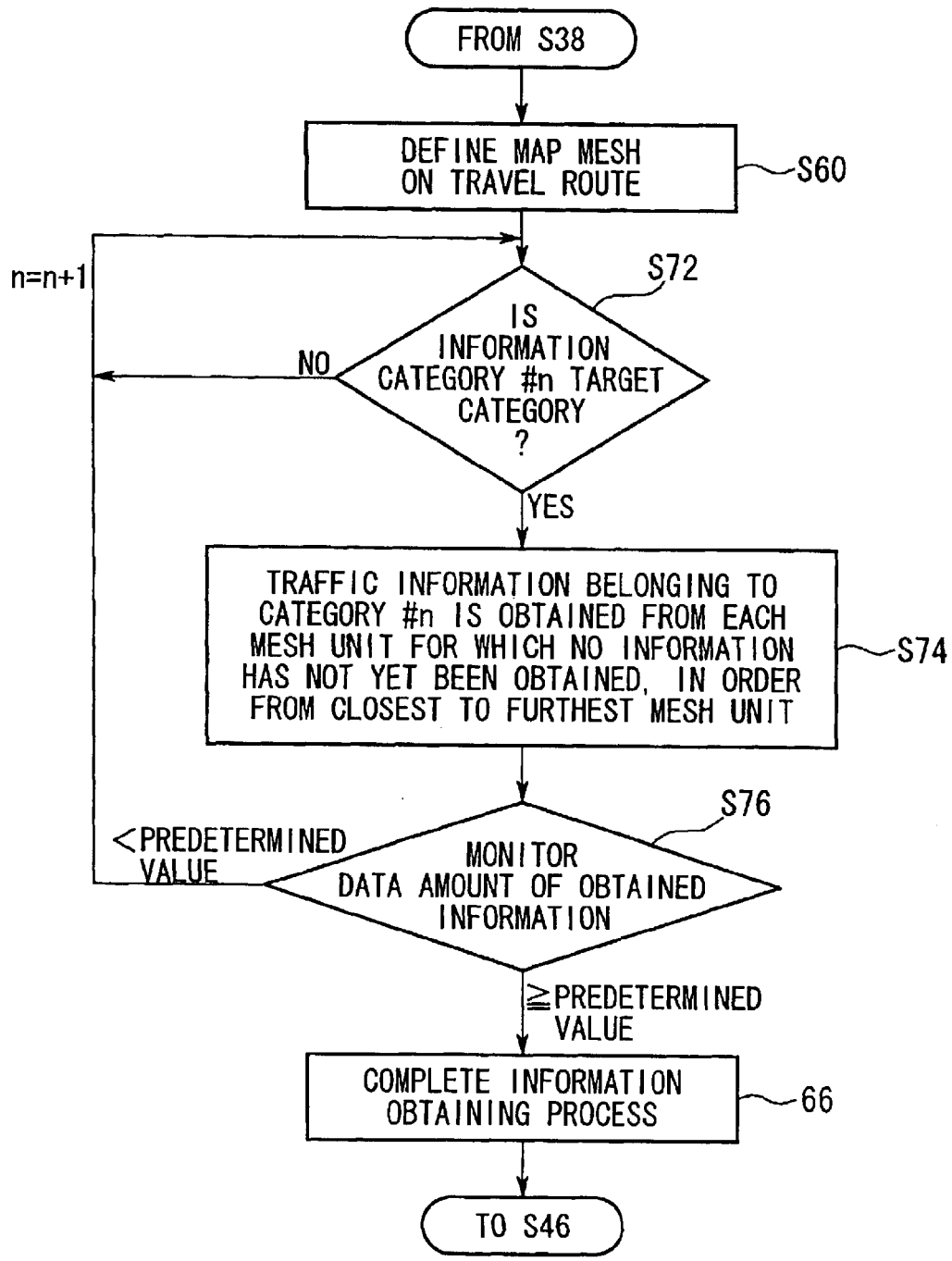
FIG. 6 is a process chart of another example of the information obtaining process in FIG. 4.

In the information obtaining process in step S40, the process shown in FIG. 5 and the process shown in FIG. 6 may be combined. That is, detailed traffic information may be obtained for the mesh units M01 (which includes the position of the vehicle 3) to M03 (a predetermined mesh unit) according to the process of FIG. 6, while (relatively) simplified traffic information may be obtained for the mesh units following the mesh unit M03 according to the process of FIG. 5.

Accordingly, traffic information for a section relatively close to the vehicle 3, which (the information) is highly urgent or useful for a passenger of the vehicle 3, can be detailed information, while traffic information for a section relatively far from the vehicle 3 can be simplified but highly-useful information. That is, only traffic information having high priority with respect to the necessity for the passenger can be sent. When receiving such traffic information, the vehicle navigation device 8 can calculate a further suitable travel route, thereby further improving the comfort of travel of the vehicle.

What is claimed is:

1. A vehicle navigation server comprising:
    a travel route calculating device for calculating at least one proposed travel route of a vehicle based on data input by a registrant to the server, the data including a current or start position and a destination of the vehicle;
    a map mesh defining device for defining a map mesh consisting of mesh units, which contains the proposed travel route;
    a traffic information extracting device for extracting traffic information relating to each mesh unit of the proposed travel route from a traffic information storage device, wherein the traffic information relating to the mesh unit which includes the start or current position of the vehicle is obtained first;
    a data amount monitoring device for monitoring a total amount of extracted information, wherein the data amount monitoring device terminates information extraction when the total amount of extracted information becomes equal to or larger than a predetermined value; and
    a data sending device for sending the extracted traffic information to a vehicle navigation device associated with the vehicle.

2. A vehicle navigation server as claimed in claim 1, wherein the traffic information sent to the vehicle navigation device is selectable from one or more information categories, and the traffic information belonging to at least one selected information category is sent to the vehicle navigation device.

3. A vehicle navigation server as claimed in claim 1, wherein the traffic information sent to the vehicle navigation device is a combination of detailed information about a section from the mesh unit which includes the current or start position of the vehicle to a predetermined one of the mesh units and simplified information about the remaining mesh units following the predetermined mesh unit.

4. A vehicle navigation server as claimed in claim 2, wherein the traffic information sent to the vehicle navigation device is a combination of detailed information about a section from the mesh unit which includes the current or start position of the vehicle to a predetermined one of the mesh units and simplified information about the remaining mesh units following the predetermined mesh unit.

5. A vehicle navigation server as claimed in claim 1, wherein the traffic information is extracted for each mesh unit in order from the mesh unit closest to the vehicle to the mesh unit furthest from the vehicle.

6. A vehicle navigation server as claimed in claim 2, wherein said at least one information category is selected in advance by a passenger of the vehicle.

7. A method of providing traffic information from a vehicle navigation server, the method comprising steps of:
    calculating at least one proposed travel route of a vehicle based on data input by a registrant to the server, the data including a current or start position and a destination of the vehicle;
    defining a map mesh having mesh units, the map mesh including a representation of the proposed travel route;
    extracting traffic information relating to each mesh unit of the proposed travel route from a traffic information storage device in a manner such that traffic information relating to the mesh unit which includes the start or current position of the vehicle is obtained first;
    monitoring a total amount of extracted traffic information;
    terminating the information extraction when the total amount of extracted traffic information becomes equal to or larger than a predetermined value; and
    sending the extracted traffic information to a vehicle navigation device associated with the vehicle.

8. A method as claimed in claim 7, further comprising the step of selecting at least one category of traffic information, wherein the traffic information sent to the vehicle navigation device is at least from the selected category.

9. A method as claimed in claim 7, wherein the traffic information sent to the vehicle navigation device is a combination of information including information about a section from the mesh unit which includes the current or start position of the vehicle to a predetermined one of the mesh units and information about the remaining mesh units following the predetermined mesh unit.

10. A method as claimed in claim 7, wherein the traffic information is extracted for each mesh unit in order from the mesh unit closest to the vehicle to the mesh unit furthest from the vehicle.

11. A method as claimed in claim 8, wherein said at least one information category is selected in advance by a passenger of the vehicle.

12. A vehicle navigation apparatus comprising:
    a travel route calculating means for calculating at least one proposed travel route of a vehicle based on data input by a registrant to the apparatus, the data including a current or start position and a destination of the vehicle;
    a map mesh defining means for defining a map mesh consisting of mesh units, the map mesh containing information defining the proposed travel route;
    a traffic information extracting means for extracting traffic information relating to each mesh unit of the proposed travel route from a traffic information storage device, the traffic information extracting means extracting traffic information in a manner such that traffic information relating to the mesh unit which includes the start or current position of the vehicle is obtained first;
    a data amount monitoring means for monitoring a total amount of extracted information, wherein the data amount monitoring means terminates the information extraction when the total amount of extracted information becomes equal to or larger than a predetermined value; and
    a data sending means for sending the extracted traffic information to a vehicle navigation device linked with the vehicle.

13. A vehicle navigation apparatus as claimed in claim 12, wherein the traffic information sent to the vehicle navigation device is selectable from one or more information categories.

14. A vehicle navigation apparatus as claimed in claim 12, wherein the traffic information sent to the vehicle navigation device is a combination of information including information about a section from the mesh unit which includes the current or start position of the vehicle to a predetermined one of the mesh units and information about the remaining mesh units following the predetermined mesh unit.

15. A vehicle navigation apparatus as claimed in claim 12, wherein the traffic information is extracted for each mesh unit in order from the mesh unit closest to the vehicle to the mesh unit furthest from the vehicle.

16. A vehicle navigation apparatus as claimed in claim 13, wherein the information category is selected in advance by a passenger of the vehicle.

* * * * *